United States Patent
Hwang et al.

(10) Patent No.: US 7,447,951 B2
(45) Date of Patent: Nov. 4, 2008

(54) INFORMATION STORAGE MEDIUM, METHOD OF MANAGING REPLACEMENT INFORMATION, RECORDING/REPRODUCING APPARATUS, AND HOST APPARATUS

(75) Inventors: Sung-hee Hwang, Suwon-si (KR); Jung-wan Ko, Suwon-si (KR); Sung-ryeul Rhyu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 260 days.

(21) Appl. No.: 11/201,320

(22) Filed: Aug. 11, 2005

(65) Prior Publication Data

US 2006/0087945 A1 Apr. 27, 2006

(30) Foreign Application Priority Data

Oct. 25, 2004 (KR) .................. 10-2004-0085514
Nov. 3, 2004 (KR) .................. 10-2004-0088981

(51) Int. Cl.
*G11C 29/00* (2006.01)
*G11B 11/00* (2006.01)

(52) U.S. Cl. ............... 714/710; 369/53.1; 369/53.15
(58) Field of Classification Search ............ 714/710, 714/718; 369/53.1, 53.15; 365/200, 201
See application file for complete search history.

(56) References Cited

U.S. PATENT DOCUMENTS

| 5,715,221 A * | 2/1998 | Ito et al. ............ 369/47.14 |
| 2004/0071056 A1 | 4/2004 | Park et al. |
| 2004/0145980 A1 | 7/2004 | Park et al. |
| 2005/0166857 A1 * | 8/2005 | Deroo et al. ............ 119/171 |

FOREIGN PATENT DOCUMENTS

| EP | 1 347 452 | 3/2003 |
| WO | WO 2004/029668 | 4/2004 |

OTHER PUBLICATIONS

PCT International Search Report and Written Opinion of the International Searching Authority issued Jan. 31, 2006 re: International Application No. PCT/KR2005/003506.

* cited by examiner

*Primary Examiner*—Phung M Chung
(74) *Attorney, Agent, or Firm*—Stein, McEwen & Bui, LLP

(57) ABSTRACT

An information storage medium, a replacement information management method, a recording/reproducing apparatus, and a host apparatus are provided. The information storage medium includes: a defect list for storing replacement entries having replacement information related to replacement of defects detected in data recorded on the medium or replacement to update data recorded on the medium, wherein at least one replacement entry having invalid replacement information among the replacement entries stored in the defect list is deleted. Accordingly, an overflow of the defect list can be prevented and the size of the defect list can be minimized, thereby increasing medium usage efficiency.

39 Claims, 13 Drawing Sheets

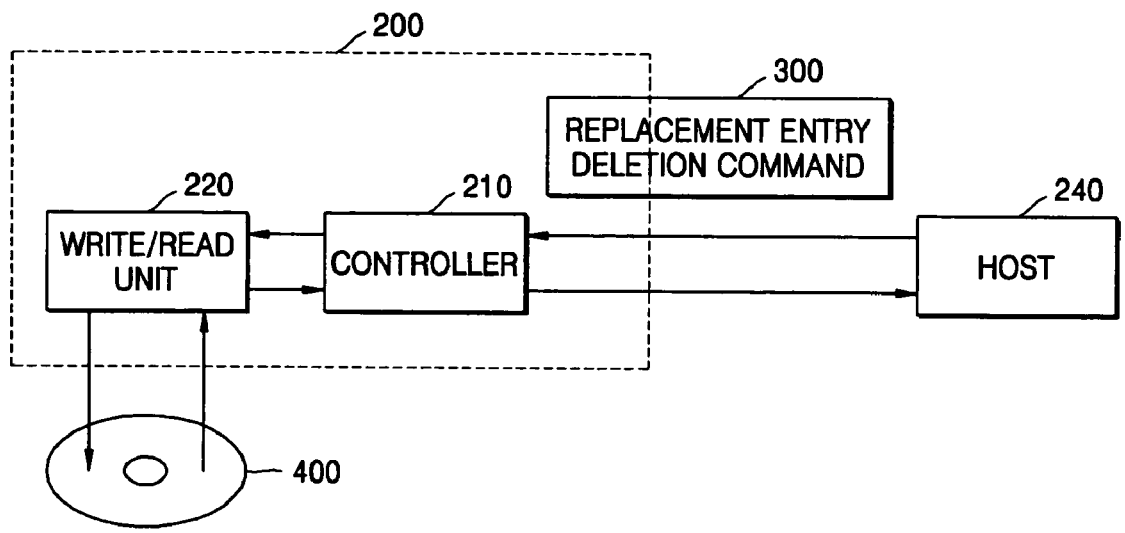

DELETION OF FILE A'

FIG. 11A

DEFECT LIST (500)

| | | |
|---|---|---|
| REPLACEMENT ENTRY #1 | Pa : Pa2 | Pc : Pd |
| REPLACEMENT ENTRY #2 | Pa2 : Pa3 | Pe : Pf |
| REPLACEMENT ENTRY #3 | Pa3 : Pb | Pg : Ph |

FIG. 11B

DEFECT LIST (500)

| | | | |
|---|---|---|---|
| REPLACEMENT ENTRY #1 | ~~Pa : Pa2~~ | ~~Pc : Pd~~ | DELETION |
| REPLACEMENT ENTRY #2 | ~~Pa2 : Pa3~~ | ~~Pe : Pf~~ | DELETION |
| REPLACEMENT ENTRY #3 | ~~Pa3 : Pb~~ | ~~Pg : Ph~~ | DELETION |

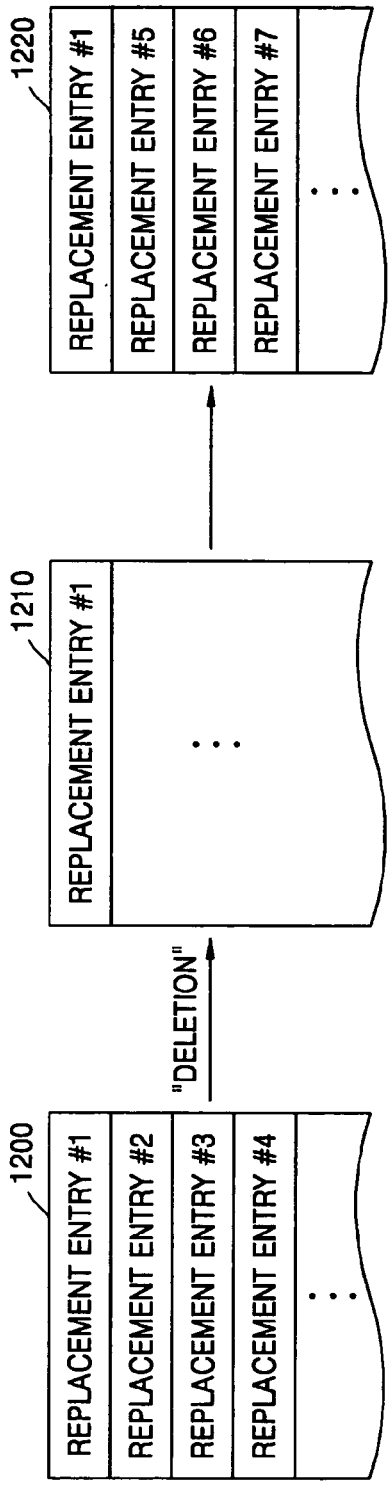
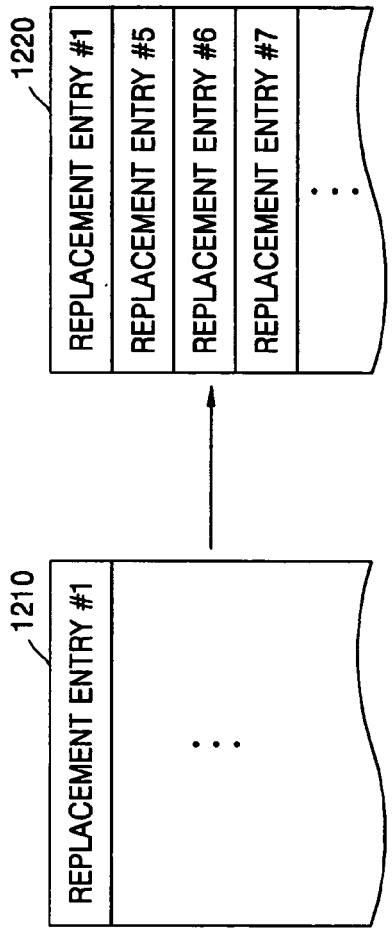
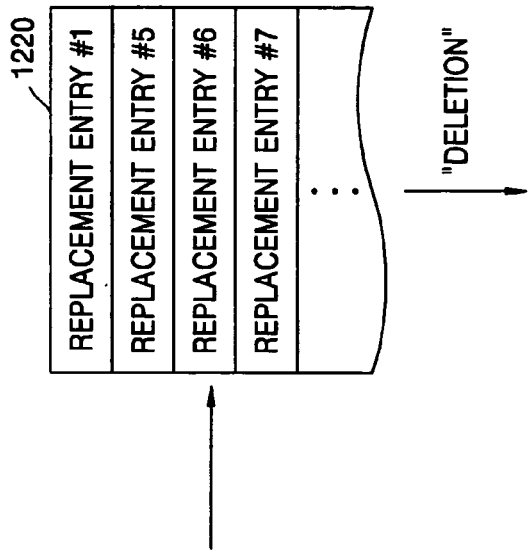
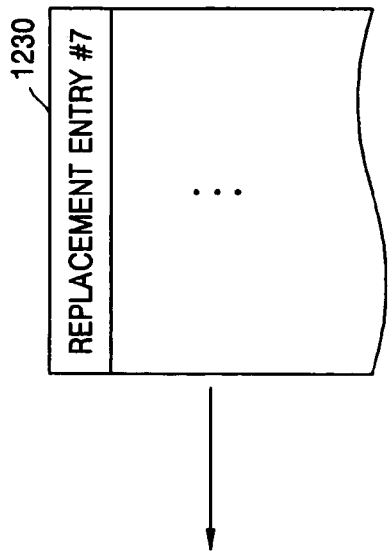
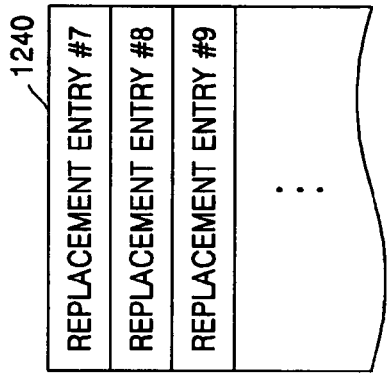
FIG. 12A
FIG. 12B
FIG. 12C
FIG. 12D
FIG. 12E

INFORMATION STORAGE MEDIUM, METHOD OF MANAGING REPLACEMENT INFORMATION, RECORDING/REPRODUCING APPARATUS, AND HOST APPARATUS

CROSS-REFERENCE TO RELATED APPLICATIONS

This application claims all benefits accruing under 35 U.S.C. §119 from Korean Patent Application Nos. 10-2004-85514 and 10-2004-88981, filed on Oct. 25, 2004, and Nov. 3, 2004, respectively, in the Korean Intellectual Property Office, the disclosures of which are incorporated in their entirety by reference herein.

BACKGROUND OF THE INVENTION

1. Field of the Invention

The present invention relates to an information storage medium, and more particularly, to an information storage medium such as an optical disc, a method of managing replacement information, a recording/reproducing apparatus and a host apparatus, that enable efficient use of an information storage medium.

2. Related Art

For rewritable information storage media, a spare area is typically provided in a data area for defect management. That is, if a defect occurs while user data is being recorded in a user data area (an area in the data area that excludes the spare area) or data recorded in the user data area is being reproduced, replacement data to replace defect data is recorded in the spare area.

For write-once information storage media, the above defect management technique is used in a logical overwrite (LOW). LOW is known as a method in which the write-once information storage media in the same manner as the rewritable information storage media. That is, to update data already recorded in the user data area, recorded data can be considered as defect data, and data to replace the recorded data can be recorded in the spare area by considering the recorded data as defect data. This makes data management easier since a host can access data using a logical address thereof and data for replacing the recorded data in the user data area can be overwritten at the same location by using the fixed logical address of the data recorded in the user data area and assigning a physical address corresponding to the fixed logical address to the data recorded in the spare area. In addition, a new method which implements LOW for defect management has been suggested to maximize the use of an information storage medium. In such a method, updated data can also be recorded in an unrecorded portion of a user data area in addition to a spare area on an information storage medium, and replacement information (replacement entry information) can be prepared accordingly.

Logical overwrite (LOW) for defect management will now be described with reference to FIGS. 1A and 1B as follows.

FIGS. 1A and 1B are reference diagrams of an example data area on an information storage medium used to illustrate a gap between a logical volume space and a physical volume space when a logical overwrite (LOW) for defect management is implemented.

Referring to FIG. 1A, a data area 100 includes a series of a spare area (SA) #1 110, a user data area 120 and another spare area (SA) 130, and data A is recorded from a start address of the user data area 120.

When the data A already recorded in the user data area 120 is updated, as shown in FIG. 1B, updated data A is recorded next to the data A to replace the data A recorded in the user data area 120. By recording data to replace data recorded in the user data area 120 in an unrecorded area of the user data area 120, both the data A and the updated data A exist in the physical volume space, and the updated data A exists in the logical volume space. According to LOW, like in the case of rewritable information storage media, data can be updated in write-once information storage media without changing their logical addresses.

Since LOW defect replacement is performed in the spare area SA 110 or 130, or the user data area 120, replacement entries providing information on replaced states are required.

For conventional replacement entries, since there exist only replacement (defect) entries due to defect blocks on an information storage medium, an entry size of the replacement entries can be somewhat predicted, and thus the size of a defect list storing the replacement entries can be defined.

However, since an increase of the size of replacement entries due to LOW can result in an excessive increase of the overall size of the replacement entries that the defect list can store, an overflow of the defect list is likely to occur which can cause problems.

For the write-once information storage media, since the defect list is recorded in a subsequent unrecorded area, and not re-recorded at the same location when the defect list is updated in a defect management area, an updated area of the defect list is not necessarily needed if a unit of the defect list is smaller. Thus, the number of times when updating is performed can be increased.

For rewritable information storage media, file system data is typically assigned to a predetermined close area such as a start or end portion of a logical volume space. When a rewritable information storage medium is loaded in a drive system, the file system data should be read first, and by assigning the file system data to the predetermined close space, a reproducing time of the file system data can be minimized. For rewritable apparatuses, a state of the predetermined close area of the logical volume space can be physically maintained due to a rewriting function even if a portion of the file system data is updated.

However, for write-once information storage media, when a portion of the file system data is updated by LOW, even if a logical location of the updated file system data is the same, there is no alternative but to change a physical location of the updated file system data. Because of this requirement, unlike for the case of the rewritable information storage media, there is no choice but to separately assign physical locations of the file system data of the write-once information storage media even if the file system data is logically assigned to a predetermined close area. As a result, a significant amount of time is required to reproduce the file system data when a write-once information storage medium is loaded in a drive system.

Likewise, a report of replacement entries from a drive system or a similar method can be used to determine a state in which file system data or data used for a similar purpose is physically dispersed. In this situation, a reproducing time of the file system data can be minimized, when a host such as a file system (FS) drive reassigns the dispersed data to a predetermined close area. In this case, the existing file system data should be deleted due to the reassignment. However, the replacement entries of the deleted data still remain in the physical volume space. Thus, when this state repeats, the defect list easily overflows due to useless replacement entries. Alternatively, in a case where the size of the defect list is not fixed, the defect management area can be quickly exhausted due to an increase of the size of the defect list. As a result, an effective use time of an information storage medium is decreased, which can cause an inconvenience to a user. Accordingly, needed are new techniques to leverage a defect list for defect management efficiency.

SUMMARY OF THE INVENTION

Various aspects of the present invention advantageously provide an information storage medium for use in conjunction with a recording/reproduction apparatus and a host in which the size of a defect list is minimized and an overflow of any replacement entry in the defect list is prevented so as to increase usage efficiency. Replacement entries which are not used by a file system (FS) and which do not contain valid user data in a drive system using LOW replacement can be accurately maintained in such a defect list and advantageously replaced when necessary to avoid an overflow for both usage and size efficiency.

According to an aspect of the present invention, there is provided an information storage medium comprising: a defect list for storing one or more replacement entries having replacement information related to replacement of defects detected in data recorded on the information storage medium or replacement to update data recorded on the information storage medium, wherein at least one replacement entry having invalid replacement information among the replacement entries stored in the defect list is deleted.

The invalid replacement information may include replacement information unused by a file system or replacement information related to invalid user data. The at least one replacement entry having invalid replacement information may be deleted by a host or by a drive system according to a command from the host.

The information storage medium may be a write-once information storage medium.

According to another aspect of the present invention, there is provided a replacement information management method comprising: providing a defect list for storing one or more replacement entries having replacement information related to replacement of defects detected in data recorded on an information storage medium or replacement to update date recorded on the information storage medium; and deleting at least one replacement entry having invalid replacement information among replacement entries stored in the defect list.

The deleting step may comprise: receiving replacement entries from a recording/reproducing apparatus; selecting at least one replacement entry having the invalid replacement information from the received replacement entries; and transmitting a command of deleting the at least one replacement entry that was selected to the recording/reproducing apparatus.

When invalid replacement information and valid replacement information are mixed in a replacement entry according to the deletion command, the replacement entry may not be deleted by the recording/reproducing apparatus.

The command of deleting the at least one replacement entry that was selected may include at least one of a replacement entry deletion flag and information on a range of original addresses of replacement entries to be deleted from the defect list.

The information on the range of the original addresses may be represented by information on a start address of the original addresses to be deleted from the defect list, and a range to be deleted from the start address or by a start address and an end address of the original addresses to be deleted from the defect list.

The deleting step may comprise: receiving a defect list from a recording/reproducing apparatus; deleting at least one replacement entry having the invalid replacement information from the received defect list; and transmitting the defect list from which the at least one replacement entry having the invalid replacement information has been deleted to the recording/reproducing apparatus.

When invalid replacement information and valid replacement information are mixed in a replacement entry, the deleting step may comprise determining not to delete the replacement entry from the defect list.

According to another aspect of the present invention, there is provided a recording/reproducing apparatus comprising: a write/read unit writing data on or reading data from an information storage medium including a defect list for storing the replacement entries having replacement information related to replacement of defects detected in data recorded on the information storage medium or replacement for updating data recorded on the information storage medium; and a controller deleting at least one replacement entry having the invalid replacement information among the replacement entries stored in the defect list.

According to another aspect of the present invention, there is provided a host apparatus for controlling operation of a recording/reproducing apparatus, the host apparatus comprising: means for receiving a defect list for storing replacement entries having replacement information related to replacement of defects detected in data recorded on an information storage medium or replacement to update data recorded on the information storage medium; and a controller for deleting at least one replacement entry having invalid replacement information among replacement entries stored in the defect list.

According to another aspect of the present invention, there is provided an information storage medium comprising: a defect list for storing replacement entries having replacement information related to replacement of defects detected in data recorded on the information storage medium or replacement for updating data recorded on the information storage medium, wherein, if at least one replacement entry having invalid replacement information among the replacement entries stored in the defect list is deleted, information on the at least one replacement entry that was deleted is recorded in a predetermined area of the information storage medium.

The information on the at least one replacement entry that was deleted may include at least one of defect list location information right before the deletion of the at least one replacement entry, defect list location information right after the deletion of the at least one replacement entry, location information of a temporary disk definition structure (TDDS) containing the defect list location information right before the deletion of the at least one replacement entry, location information of a TDDS containing the defect list location information right after the deletion of the at least one replacement entry, original location information of the at least one replacement entry that was deleted, replacement location information of the at least one replacement entry that was deleted, a defect list deletion count indicating the number of replacement entry deletion operations, and a defect list deletion flag indicating whether a replacement entry deletion operation is performed.

The predetermined area may correspond to one of a defect list, a temporary disk definition structure (TDDS), a user control area, and an access control area on the information storage medium.

According to another aspect of the present invention, there is provided a recording/reproducing apparatus comprising: a write/read unit writing data on or reading data from an information storage medium including a defect list for storing the replacement entries having replacement information related to replacement of defects detected in data recorded on the information storage medium or replacement for updating data recorded on the information storage medium; and a controller controlling the write/read unit to write information on at least one replacement entry that was deleted in a predetermined area of the information storage medium if at least one replacement entry having invalid replacement information among the replacement entries stored in the defect list is deleted.

According to another aspect of the present invention, there is provided a recording/reproducing method comprising: providing an information storage medium including a defect list for storing the replacement entries having replacement information related to replacement of defects detected in data recorded on the information storage medium or replacement for updating data recorded on the information storage medium; determining if at least one replacement entry having invalid replacement information among the replacement entries stored in the defect list is deleted; and recording information on the at least one replacement entry that was deleted in a predetermined area of the information storage medium.

According to another aspect of the present invention, there is provided a defect list recovering method comprising: reading, from an information storage medium in which at least one replacement entry having invalid replacement information among replacement entries stored in a defect list for storing the replacement entries having replacement information related to replacement of defects detected in data recorded on the information storage medium or replacement for updating data recorded on the information storage medium is deleted, information on the at least one replacement entry that was deleted; and recovering a damaged defect list based on the information on the at least one replacement entry that was deleted.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 2 is a schematic block diagram of an example recording/reproducing apparatus according to an embodiment of the present invention;

FIG. 3 illustrates an example of a replacement entry deletion command shown in FIG. 2;

FIGS. 11A and 11B illustrate deletion states of replacement entries shown in FIGS. 10A and 10B;

FIGS. 12A through 12E are reference diagrams of an example defect list to illustrate an efficient replacement entry recovering method according to an embodiment of the present invention;

DETAILED DESCRIPTION OF THE EMBODIMENTS

Figure 1A:
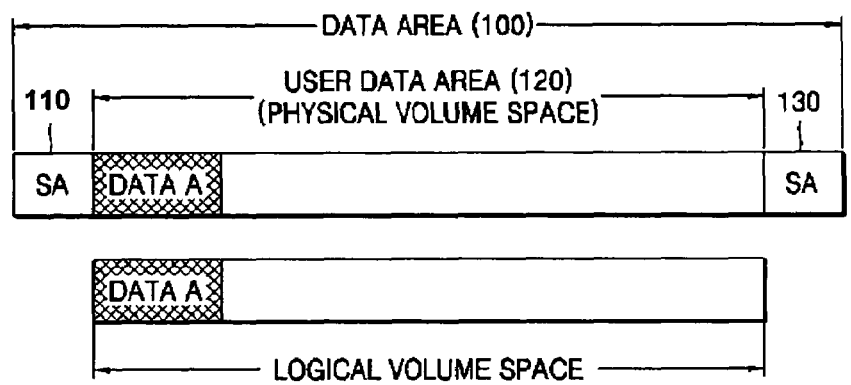
FIGS. 1A and 1B are reference diagrams of an example data area on an information storage medium used to illustrate a gap between a logical volume space and a physical volume space when a logical overwrite (LOW) for defect management is implemented conventionally.
Figure 1B:
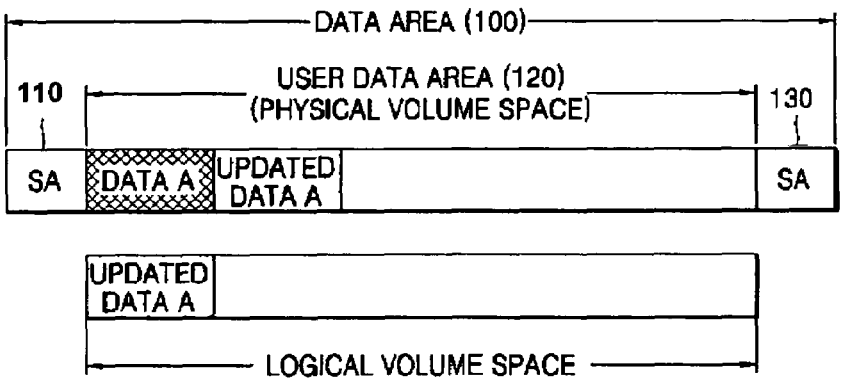

The present invention is applicable for use with all types of memory or computer-readable media, recording and/or reproducing apparatuses, and computer systems implemented methods described according to various embodiments of the present invention. However, for the sake of simplicity, discussions will concentrate mainly on exemplary use of an optical disk serving as a write-once information storage medium, although the scope of the present invention is not limited thereto.

Turning now to FIG. 2, a schematic block diagram of an example recording/reproducing apparatus 200 according to an embodiment of the present invention is illustrated. Referring to FIG. 2, the recording/reproducing apparatus 200 includes a write/read unit 220 and a controller 210. For purposes of brevity, the recording/reproducing apparatus 200, albeit in whole or in part, can also be referred to as a drive system which can be internal (housed within the host 240) or external (housed in a separate box that connects to the host 240.

Under the control of the controller 210, the write/read unit 220 records data on a disk 400, which serves as an information storage medium according to the present invention, and reads data to reproduce the recorded data from the disk 400. The controller 210 controls the write/read unit 220 so as to record data in units of a predetermined recording unit block, or obtains valid data by processing read data using the write/read unit 220.

In a recording operation, the controller 210 controls the write/read unit 220 to record data by performing a logical overwrite (LOW) according to a command of a host 240 or a control of a drive system 200. In case where a defect is detected during a data write process or during a verify-after-write process, the controller 210 controls the write/read unit 220 to record a replacement block for replacing a defect block in a spare area. In LOW, data recorded in a user data area of a disk 400, i.e., a write-once information storage medium is updated, i.e., replacement data is recorded in a spare area or an unrecorded area of the user data area, and address information of the original data and the replacement data can be managed so that a logical address used by a host 240 is not changed. The controller 210 performs LOW replacement and defect replacement.

Figure 4:
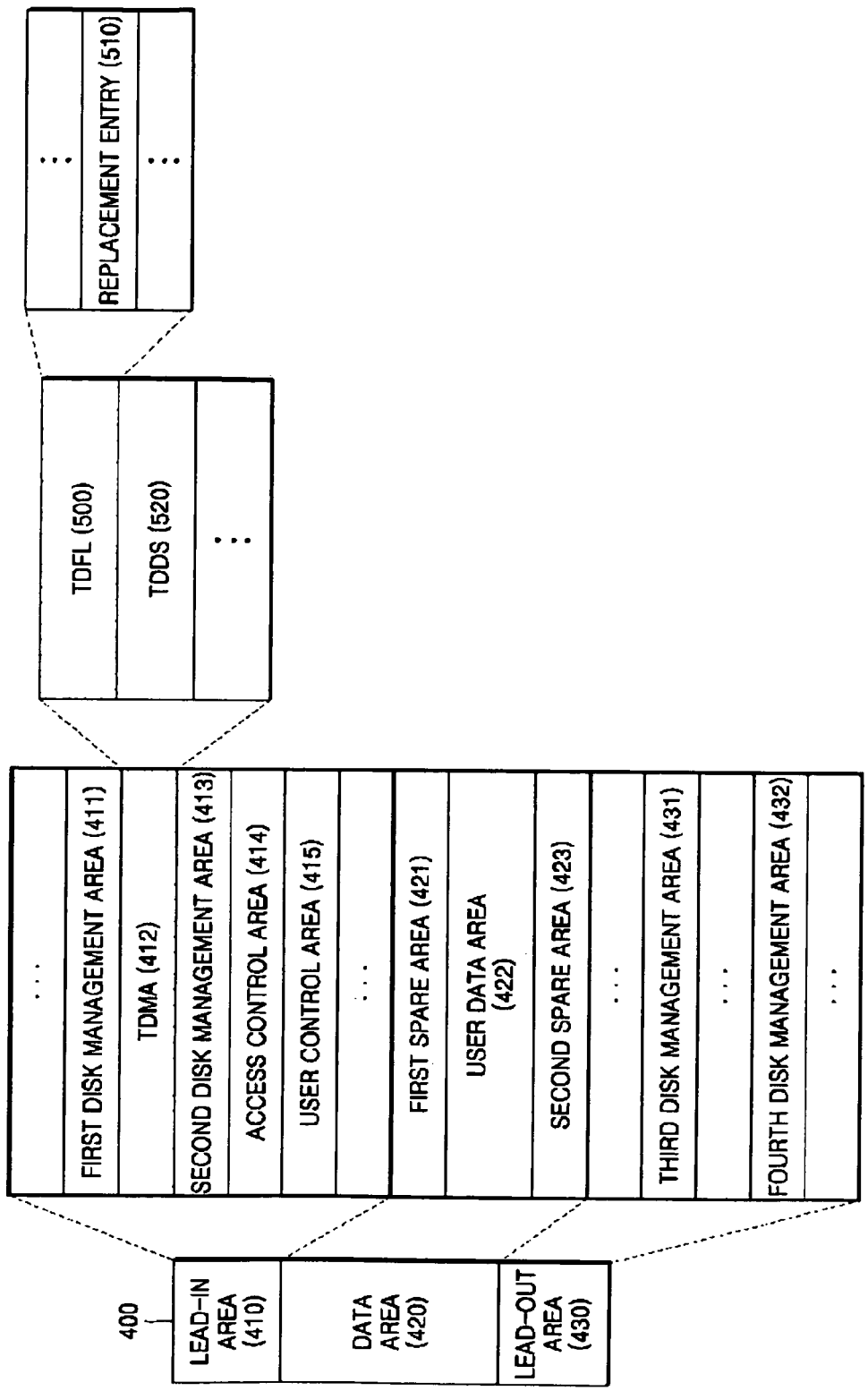
FIG. 4 illustrates an example structure of an information storage medium according to an embodiment of the present invention.

In particular, according to various embodiments of the present embodiment, when a replacement entry request command 300 is received from the host 240, the controller 210 reads a temporary defect list (TDFL) from a temporary disk management area (TDMA) on the disk 400 and transmits the temporary defect list (TDFL) to the host 240, as will be shown in FIG. 4. Further, when information on replacement entries to be deleted is received from the host 240, the controller 210 deletes the replacement entries from a defect list (TDFL). In addition, when the deletion of the replacement entries is performed, the controller 210 records information on the deleted replacement entries, which includes location information of the defect list (TDFL) in which the deletion is performed, in a predetermined area of the disk 400 for historical purposes.

Specifically, when there are useless replacement entries on the defect list (TDFL), one or more replacement entries in which valid data is not recorded therein, or one or more replacement entries to be deleted for other reasons, the host 240 transmits a replacement entry request command to the drive system 200 requesting replacement entries. Upon receipt of replacement entries from the drive system 200, the host 240 selects unused replacement entries, replacement entries in which valid user data is not recorded and replacement entries to be deleted among the received replacement entries, and then instructs the drive system 200 to delete selected replacement entries from the defect list (TDFL).

The host 240 can perform an operation of deleting the useless replacement entries periodically, when an overflow of the defect list is predicted, or whenever a predetermined reason occurs, so as to prevent replacement entries having useless replacement information from being repeatedly updated, thereby maximizing an efficient use of memory space in the defect list (TDFL). The operation of deleting the useless replacement entries can be performed by an application program provided to the host 240, even after an overflow of the defect list (TDFL) occurs. That is, an application program that is especially designed for deleting useless replacement entries on a defect list (TDFL), can be provided at either the host 240 or the drive system 200, and periodically activated to perform the deleting operation, i.e., to examine the defect list (TDFL) and delete invalid replacement entries on the defect list (TDFL), thereby maximizing the use of the disk 400, even if an overflow of the defect list (TDFL) occurs.

FIG. 3 illustrates an example of a replacement entry deletion command 300 shown in FIG. 2. When the host 240 informs the drive system 200 of replacement entries to be deleted, an interface such as a command suet is generally used, and a replacement entry deletion command 300 can have an example data structure as shown in FIG. 3.

Referring to FIG. 3, the replacement entry deletion command 300 includes a replacement entry deletion flag 310 and a range of original addresses to be deleted 320.

The replacement entry deletion flag 310 represents a flag indicating whether replacement entries in the range of original addresses to be deleted 320 are deleted.

The range of original addresses to be deleted 320 can be represented by a start address 321 and a length 322 indicating a range of the replacement entries be deleted with reference to (a) of FIG. 3 and by a start address 323 and an end address 324 with reference to (b) of FIG. 3.

When a replacement entry deletion command 300 is received from the host 240, the drive system determines if a replacement entry deletion flag 310 is set, and if addresses corresponding to the range of original addresses to be deleted 320 are stored as original addresses of replacement entries, the drive system deletes the replacement entries. If the range of original addresses to be deleted 320 corresponds to a portion of original addresses of replacement entries, the replacement entries should not be deleted. If the range of original addresses to be deleted 320 does not correspond to original addresses of replacement entries, the replacement entry deletion command 300 can be ignored.

FIG. 4 illustrates a structure of an optical disk 400 serving as a write-once information storage medium according to an embodiment of the present invention.

Referring to FIG. 4, the disk 400 includes a lead-in area 410, a data area 420 and a lead-out area 430.

The lead-in area 410 includes a first disk management area 411, a temporary disk management area (TDMA) 412, a second disk management area 413, an access control area 414 and a user control area 415. The first and second disk management areas 411 and 412 are provided to record information regarding one or more defects occurring in the data area 420. In contrast to the lead-in area 410, the lead-out area 430 includes a third disk management area 431 and a fourth disk management area 432 but not a temporary disk management area (TDMA).

The TDMA 412 included in the lead-in area 410 is an area used to record information on temporary defect management and temporary disk management of the disk 400.

The TDMA 412 includes a temporary defect list (TDFL) 500 and a temporary disk definition structure (TDDS) 520.

The temporary defect list (TDFL) 500 contains information for indicating a replaced state in a case of defect replacement or LOW replacement, and includes location information of defect data and location information of replacement data for replacing defect data. In particular, according to an embodiment of the present embodiment, the TDFL 500 includes a replacement (defect) entry 510 which indicates partial data replacement. While FIG. 4 shows that the temporary defect list (TDFL) 500 is recorded in the TDMA 412 of the lead-in area 410, the TDFL 500 may be recorded in another area on the disk 400, for example, in the disk management area of a lead-in area 410 or a lead-out area 430.

The data area 420 includes a first spare area 421, a user data area 422, and a second spare area 423. The user data area 422 is provided to record user data. The first spare area 421 and the second spare area 423 provide replacement blocks replacing defective blocks occurring in the user data area 422.

Figure 5:
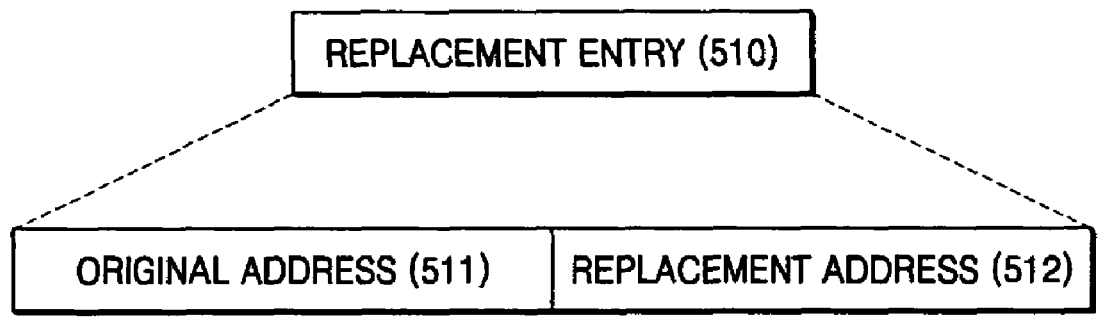
FIG. 5 illustrates an example data structure of a replacement entry shown in FIG. 4.

FIG. 5 illustrates a data structure of an example replacement (defect) entry 510 shown in FIG. 4. Referring to FIG. 5, the replacement (defect) entry 510 includes an original address 511 and a replacement address 512.

The original address 511 indicates a start address of an original recording block, and the replacement address 512 indicates a start address of a replacement recording block, since replacement is performed in block units, i.e., recording/ reproducing units, and the replaced state is represented in block units in a drive system.

The TDDS 520 includes location information of the TDFL 500.

As previously discussed, the first disk management area 411, the second disk management area 413, the third disk management area 431 and the fourth disk management area 432 provide areas wherein final disk management information is recorded when the disk 400 is finalized.

The access control area 414 is an area wherein access control data indicating information on a predetermined function applied to the disk 400 is recorded. The access control data includes a specific information field for allowing a drive system 200 to recognize and execute a predetermined function and a common information field used to set information for allowing a drive system 200 to access and control the disk 400.

The user control area 415 is a specific area for applications.

In the data area 420, a first spare area 421, a user data area 422, and a second spare area 423 are sequentially disposed.

The first and second spare areas 421 and 423 represent areas for recording replacement data to replace data recorded in the user data area 422. In the first and second spare areas 421 and 423, replacement data by a defect can be recorded, and replacement data by LOW can also be recorded.

The user data area 422 is an area for recording user data. Replacement data by LOW for replacing the user data is recorded not only in the spare areas 421 and 423 but also in the user data area 422.

Figure 6:
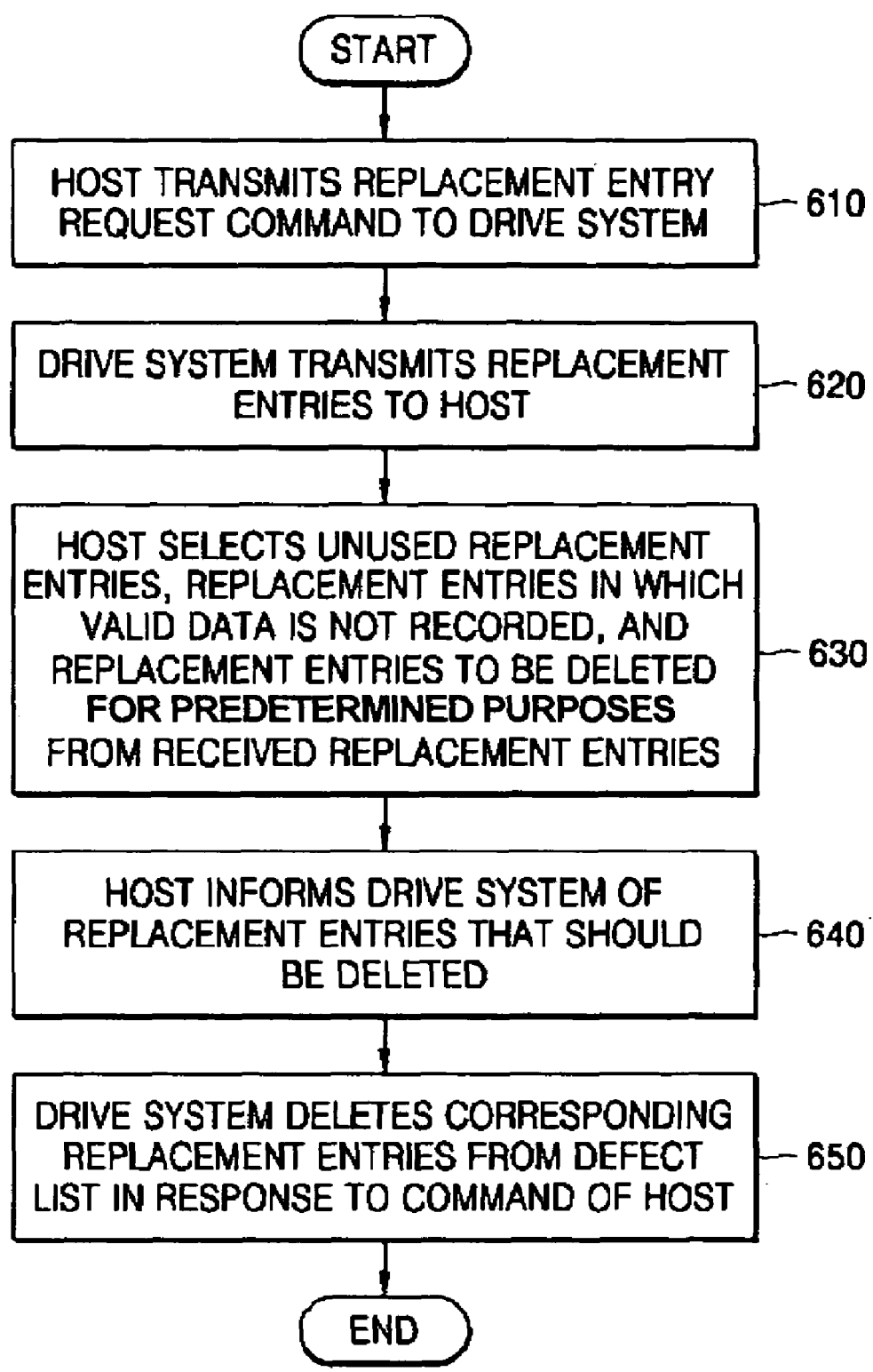
FIG. 6 is a flowchart illustrating a method of deleting replacement entries in a defect list according to an embodiment of the present invention.

FIG. 6 is a flowchart illustrating a method of deleting replacement entries in a defect list according to an embodiment of the present invention. Generally, a drive system 200, as shown in FIG. 2, deletes replacement entries 510 in a defect list 500, as shown in FIG. 4, in response to a command of the host 240. More specifically, the drive system 200 receives logical addresses or physical addresses of replacement entries 510 to be deleted from a host 240, such as an file system drive, through an interface, such as a command set, and deletes replacement entries 510 corresponding to the logical addresses or physical addresses from a defect list 500.

Referring to FIG. 6, the host 240 transmits a replacement entry request command 300, as shown in FIG. 2, to the drive system 200 in operation 610.

The drive system 200, upon receipt of the replacement entry request command 300, transmits replacement entries to the host 240 in operation 620. Here, the drive system 200 transmits a defect list 510 including replacement entries 510 to the host 240.

The host 240 determines from the replacement entries whether data corresponding to addresses before replacement (original addresses) of the replacement entries is valid, or whether the replacement entries contain data to be deleted, and selects unused replacement entries, replacement entries in which valid data is not recorded, and replacement entries to be deleted for predetermined purposes other than (1) unused replacement entries and (2) replacement entries in which valid data is not recorded thereon in operation 630.

Then the host 240 informs the drive system 200 of replacement entries that should be deleted in operation 640. An example of a command used when the host 240 informs the drive system 200 of replacement entries that should be deleted is shown in FIG. 3.

The drive system 200 deletes the corresponding replacement entries from the defect list 500 in response to the command of the host 240 in operation 650. Here, the drive system 200 deletes the replacement entries 510 if addresses in a physical volume area corresponding to a range of the original addresses are registered in original address fields of the replacement entries 510.

In the above procedure, if a unit of data management of the host 240 is different from a unit of replacement of a replacement entry 510, when the drive system 200 receives a command of deleting only a portion of the replacement entry from the host 240, the drive system 200 should not delete the entire replacement entry 510. That is, since only a portion of the replacement entry needs to be deleted, if the replacement entry is deleted, information on replacement of the remaining portion can be lost if the entire replacement entry is deleted.

Figure 7:
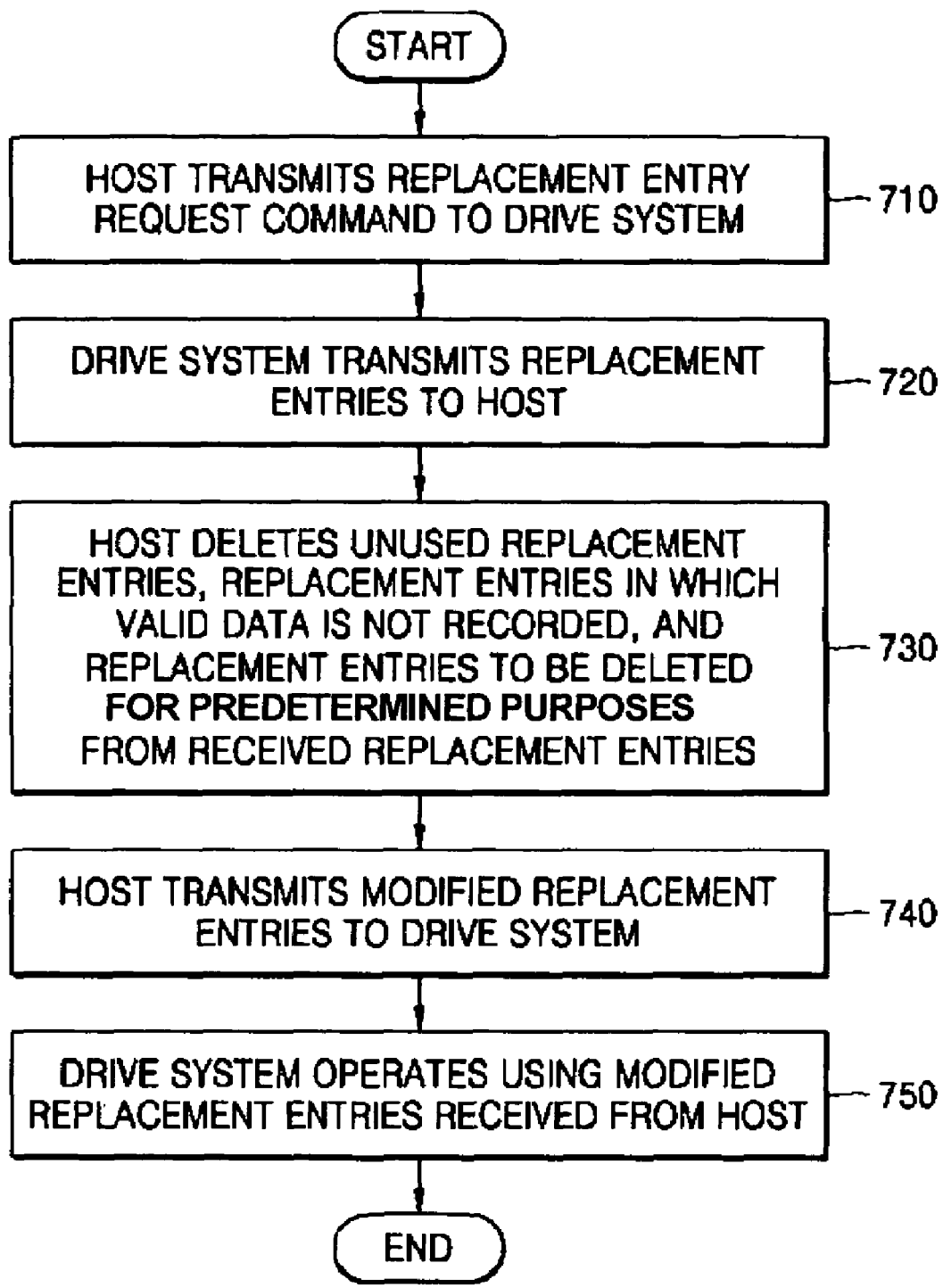
FIG. 7 is a flowchart illustrating a method of deleting replacement entries in a defect list according to another embodiment of the present invention.

FIG. 7 is a flowchart illustrating a method of deleting replacement entries on a defect list according to another embodiment of the present invention. In this method, a host 240 can directly delete replacement entries. More specifically, a drive system 200 transmits replacement entries to the host 240, and the host 240 deletes replacement entries to be deleted and transmits modified replacement entries back to the drive system 200.

Referring to FIG. 7, the host 240 transmits a replacement entry request command 300, as shown in FIG. 2 and FIG. 3, to the drive system 200 in operation 710.

The drive system 200 receives the replacement entry request command 300 and transmits replacement entries to the host 240 in operation 720.

The host 240 receives the replacement entries, determines from the replacement entries whether data corresponding to addresses before replacement (original addresses) of the replacement entries is valid or whether the replacement entries contain data to be deleted, and deletes unused replacement entries, replacement entries in which valid data is not recorded, and replacement entries to be deleted for predetermined purposes other than (1) unused replacement entries and (2) replacement entries in which valid data is not recorded thereon from the received replacement entries in operation 730.

As described in FIG. 6, if the unit of data management of the host 240 is different from the unit of replacement of a replacement entry, when the host 240 deletes useless replacement entries from the replacement entries received from the drive system 200, the host 240 should not delete a replacement entry if a portion of sectors corresponding to an original address of the replacement entry is valid. In other words, the host 240 should delete the replacement entry, only when the entire unit corresponding to the original address of the replacement entry need to be deleted.

For example, if a unit of data managed by the host 240 is different from a unit of replacement of a replacement state indicating a replacement entry as the host 240 manages the data in a unit of a sector (2048 bytes) and the drive system 200 manages the replacement entry in a unit of a block (32 sectors) composed of a plurality of sectors, when the host 240 tries to delete the replacement state of some sectors ($1^{st}$ to $31^{st}$ sectors) of the replacement entry or commands the drive system 200 to delete the replacement state, the replacement entry should not be deleted since the replacement state of the remaining $32^{nd}$ sector is also deleted if the replacement entry is deleted.

The host 240 transmits the modified replacement entries to the drive system 200 in operation 740.

The drive system 200 operates using the modified replacement entries received from the host 240 in operation 750.

Figure 8A:
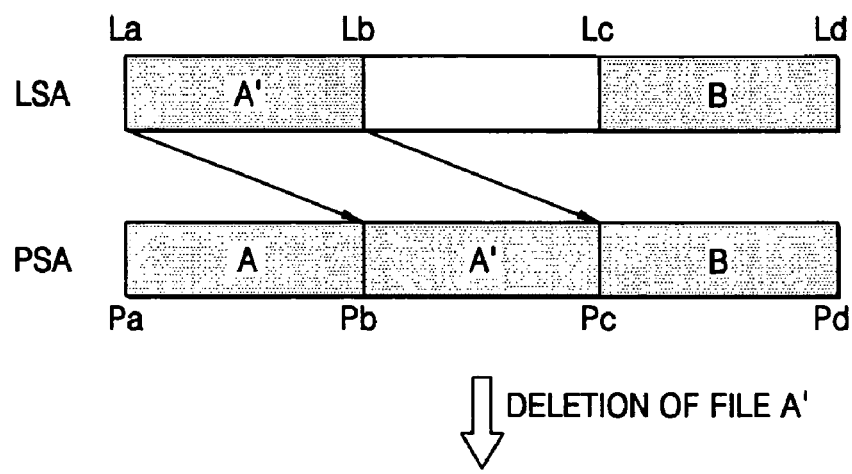
FIGS. 8A and 8B are reference diagrams of an example physical space area (PSA) and an example logical space area (LSA) to illustrate a state of a disk space in a case of deleting user data by LOW according to an embodiment of the present invention.
Figure 8B:
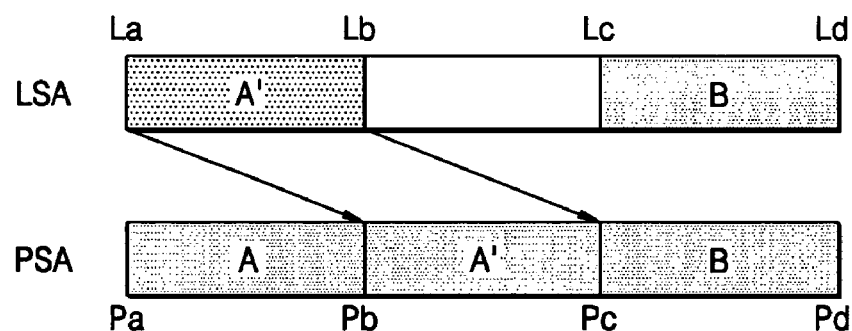

FIGS. 8A and 8B are reference diagrams of an example physical space are (PSA) and an example logical space area (LSA) used to illustrate a state of a disk space in a case of deleting user data by LOW according to an embodiment of the present invention. FIGS. 8A and 8B show a case where a replacement entry 510 included in a defect list 500 becomes useless due to deletion of a previously recorded file.

Figure 9A:
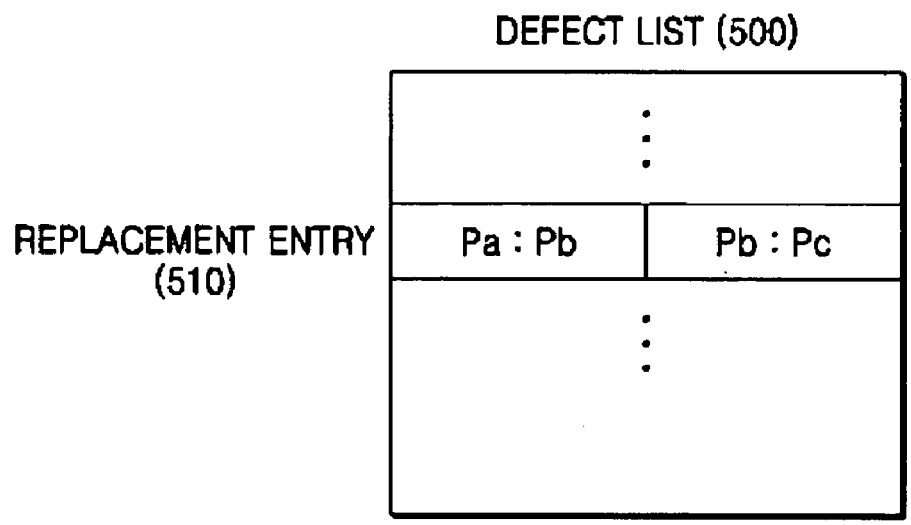
FIGS. 9A and 9B illustrate deletion states of a replacement entry shown in FIGS. 8A and 8B.

Referring to FIG. 8A, a file A is originally recorded between Pa and Pb of a physical space area (PSA) corresponding to La and Lb of a logical space area (LSA). When a host 240 commands a drive system 200 to record a file A' between La and Lb in order to update the file A, the drive system 200 replaces the file A recorded between Pa and Pb with the file A' between Pb and Pc by LOW, and generates a replacement entry 510 for indicating the replacement state as shown in FIG. 9A. The replacement entry 510 shown in FIG. 9A indicates that data recorded between Pa and Pb (original address) is replaced with data recorded between Pb and Pc (replacement address).

Figure 9B:
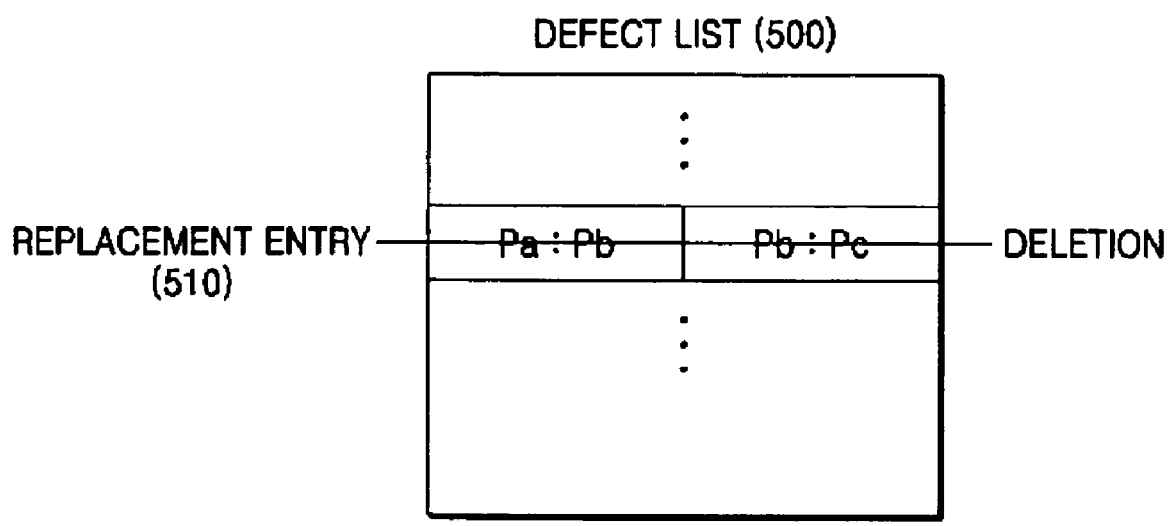

The host 240 commands the drive system 200 to record a file B between Lc and Ld, and the drive system 200 records the file B between Pc and Pd corresponding to Lc and Ld. Referring to FIG. 8B, the host 240 deletes the file A', and accordingly since replacement information of the file A' is useless, the replacement entry of the file A' is deleted from the defect list 500 as shown in FIG. 9B.

Figure 10A:
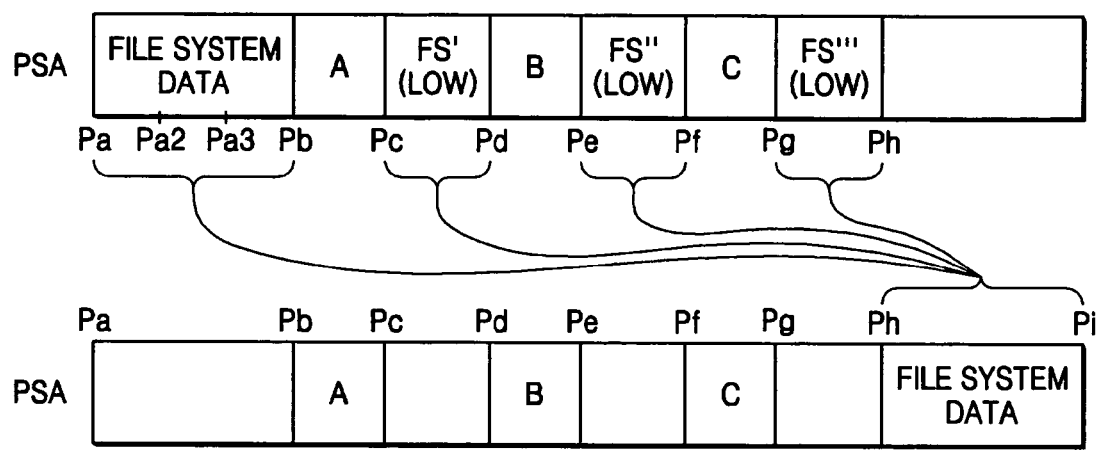
FIGS. 10A and 10B are reference diagrams of an example physical space area (PSA) and an example logical space area (LSA) to illustrate a state of a disk space in a case of arranging file system data by LOW according to an embodiment of the present invention.
Figure 10B:

FIGS. 10A and 10B are reference diagrams of an example physical space are (PSA) and an example logical space area (LSA) used to illustrate a state of a disk space in a case of arranging file system data by LOW according to an embodiment of the present invention.

FIGS. 10A and 10B show a state where general user data is updated by LOW and replaced at another physical location and FS data is updated by LOW and replaced at another physical location when adding or modifying general user data. In detail, a host such as a file system drive (not shown) rearranges the dispersed FS data and reallocates the rearranged FS data to a physically consecutive predetermined area. Accordingly, the physically dispersed FS data is useless and deleted, and as a result, replacement entries related to the deleted areas are not used any more. Thus, the replacement entries are deleted to prevent an overflow of a defect list 500 and to reduce the size of the defect list 500.

Referring to FIG. 10A, the file system data is located between Pa and Pb of a PSA, and then a file A is recorded between Pb and Pc. The file system data is updated to reflect a recording state of the file A. That is, the file system data to be updated is located between Pa and Pa2, and the updated file system data FS' is recorded between Pc and Pd by LOW.

Referring to FIG. 11A, to indicate that the file system data recorded between Pa and Pa2 is replaced with the updated file system data FS' located between Pc and Pd, a replacement entry #1 is generated in the defect list 500.

When a file B is recorded between Pd and Pe, the file system data is updated to reflect a recording state of the file B. That is, the file system data to be updated is located between Pa2 and Pa3, and the updated file system data FS" is recorded between Pe and Pf by LOW.

Referring to FIG. 11A, to indicate that the file system data recorded between Pa2 and Pa3 is replaced with the updated file system data FS" located between Pe and Pf, a replacement entry #2 is generated in the defect list.

When a file C is recorded between Pf and Pg, the file system data is updated to reflect a recording state of the file C. That is, the file system data to be updated is located between Pa3 and Pb, and the updated file system data FS''' is recorded between Pg and Ph by LOW.

Referring to FIG. 11A, to indicate that the file system data recorded between Pa3 and Pb is replaced with the updated file system data FS''' located between Pg and Ph, a replacement entry #3 is generated in the defect list 500.

In this state, the host 240 can recognize that the file system data is dispersed at several locations using a predetermined method, gather the file system data dispersed at several locations of the disk space to increase reproduction efficiency, and rearrange the file system data at a location between Ph and Pi as shown in FIG. 10B. In addition, the host 240 can arrange physical spaces of the file system data and also adjust logical space addresses of the file system data to Lh to Li in order to increase the reproduction efficiency.

Due to this, since replacement information related to the previous file system data is useless, the host 240 can save the defect list space by deleting from the defect list 500 all of the replacement entries #1, #2 and #3 indicating the replacement information before the file system data is rearranged as shown in FIG. 11B.

Though cases where the replacement entries are deleted from a defect list 500 to save the defect list space are mainly described, the various embodiments of the present invention are not limited to that, and for example, to save the defect list space, the replacement entries included in the defect list 500 might be rearranged in an update operation.

Even if replacement entries are deleted from a defect list 500 to save the defect list space, information indicating their relation states still remains on a disk 400. That is, by allocating an original address field indicating a location at which original data of a replacement block is first recorded or a previous address field indicating a just previous replacement location of the replacement block to a predetermined location of the replacement block, even if reproduction of the defect list 500 is impossible due to a damage of the defect list 500, the defect list 500 can be recovered by examining the original address field or the previous address field allocated to the predetermined location of the replacement block. In the defect list recovery process, replacement entries already deleted in the past are recovered as well. Thus, the size of the recovered defect list 500 is greater than an actually necessary size, and then an overflow may occur. In other words, since a recovery system (not shown, but can be part of a drive system 200) can know neither whether replacement entries were deleted in the past nor which replacement entries were entries deleted in the past, the replacement entries already deleted in the past are recovered as well.

Therefore, when replacement entries are deleted from the defect list 500 to save the defect list space, it is preferable that information on that the replacement entries are deleted is recorded in a predetermined area of the disk 400. A method described below can be used to record in a predetermined are of the disk 400 information on that replacement entries have been deleted by the recovery system or a system having another purpose and information on that replacement entries have been updated with a predetermined purpose. The update of the predetermined purpose, for example, can include update of the defect list 500 for arrangement of replacement entries.

FIGS. 12A through 12E are reference diagrams of an example defect list to illustrate an efficient replacement entry recovering method according to an embodiment of the present invention.

FIG. 12A shows a defect list 1200 storing replacement entries #1 through #4.

To delete useless replacement entries for saving space of the defect list 1200, such as, for example, replacement entries #2 through #4 which are determined to be useless replacement entries, the replacement entries #2 through #4 are deleted from the defect list 1200. As a result, a defect list 1210 storing only the replacement entry #1 is recorded on a disk 400 as shown in FIG. 12B.

FIG. 12C shows a defect list 1220 obtained by adding replacement entries #5 through #7 to the defect list 1210 shown in FIG. 12B.

If replacement entries #1, #5 and #6, as shown in FIG. 12B, are subsequently determined to be useless replacement entries, the replacement entries #1, #5 and #6 are deleted from the defect list 1220. As a result, a defect list 1230 storing only the replacement entry #7 is recorded on the disk 400 as shown in FIG. 12D.

FIG. 12E shows a defect list 1240 obtained by adding replacement entries #8 and #9 to the defect list 1230 shown in FIG. 12D.

In this state, if a recovery operation is performed due to difficulty of reproduction of the defect list, the recovery system will recover all of the replacement entries #1 through #9. That is, even if the replacement entries #1 through #6 have been deliberately deleted since they contained invalid information, the recovery system does not know about this and recovers the replacement entries #1 through #6 containing the invalid information as well, thereby causing the size of the defect list to increase or the defect list to overflow.

Thus, information on deleted replacement entries is known to the recovery system by recording information on a defect list from which replacement entries are deleted in a predetermined area of the disk 400. That is, if the recovery system has information on a defect list right before the deletion of the replacement entries is performed, the recovery system can know which replacement entries have been deleted by comparing replacement entries of the defect list right before the deletion of the replacement entries with replacement entries of the defect list after the deletion of the replacement entries, and a space of the defect list can be saved by not recovering the deleted replacement entries.

Referring to FIGS. 12A through 12E, by obtaining the defect lists 1200 and 1220 right before the deletion is performed, the recovery system can know that the replacement entries #2 through #4 have been deleted by comparing the defect list 1200 with the defect list 1210 and know that the replacement entries #1, #5 and #6 have been deleted by comparing the defect list 1220 with the defect list 1230.

It is preferable that "defect list (DFL) deletion history information" by which the recovery system or another system can know information on deleted replacement entries includes at least one of the following pieces of information.

First Embodiment: TDFL Location Information

1) TDFL location information right before replacement entries are deleted

2) TDFL location information right after the replacement entries are deleted

When a process of deleting at least one replacement entry included in a defect list (TDFL) is preformed a plurality of times, that is, when a deleting operation is performed again during use of a disk 400 after the deleting operation was performed once, it is preferable that TDFL location information corresponding to each deleting operation is stored. As a result, replacement entries which have been deleted, can be ascertained by comparing the TDFL before the deletion with the TDFL after the deletion.

Second Embodiment: Location Information of a Temporary Disk Definition Structure (TDDS) Containing TDFL Location Information 3) Location information of a TDDS containing TDFL location information right before replacement entries are deleted 4) Location information of a TDDS containing TDFL location information right after the replacement entries are deleted As a result, replacement entries which have been deleted can be ascertained by seeking at least one TDDS indicating location information of a TDFL before or after the deletion and reading the TDFL from the TDFL location information included in the TDDS.

Third Embodiment: Information of Deleted Replacement Entries

5) Original location information of the deleted replacement entries

6) Replacement location information of the deleted replacement entries

If necessary, one or both of items 5) and 6) can be stored.

Fourth Embodiment: TDFL Deletion Count or Flag

7) TDFL deletion count

8) TDFL deletion flag

From information on the items 7) or 8), it can be known at least whether defect list (TDFL) deletion has occurred and how many times the TDFL deletion has occurred if the TDFL deletion has occurred.

In a case of the item 7) TDFL deletion count, it is assumed that the TDFL deletion count increases by 1 whenever the deleting operation is performed. For example, when the TDFL deletion count of a defect list before the deleting operation is performed is two (2), and the TDFL deletion count of a defect list after the deleting operation is performed is three (3), and when the defect list before the deleting operation is performed is a defect list A and the defect list after the deleting operation is performed is a defect list B, deleted replacement entries can be known by comparing the defect list A with the defect list B. For the TDFL deletion count, the counting can be performed by a drive system 200 according to a command of a host 240, or the TDFL deletion count can be updated by the host 240 and the updated TDFL deletion count can be transmitted to the drive system 200. It is preferable that the TDFL deletion count is updated by the host 240.

In a case of the item 8) TDFL deletion flag, for example, when the TDFL deletion flag before the deleting operation is performed is set to "0" and changed to "1" if the deleting operation is performed, it can be known at least whether the deleting operation is performed through information on the TDFL deletion flag, and it can be known where a first deleting operation is performed.

It is preferable that all the above information is updated after the deleting operation is performed and the updated values are maintained until a subsequent deleting operation is performed. If no deleting operation has been performed, it is preferable to indicate that no deleting operation has been performed by setting the values of all the above information to "0".

In addition, all the above information can be stored in at least one of a defect list (TDFL) 500, a temporary disk definition structure (TDDS) 520, a user control area 415 (or user specific area), and an access control area 414 (deleted DFL entry history access control data (ACD)), as shown in FIG. 4.

Figure 13A:
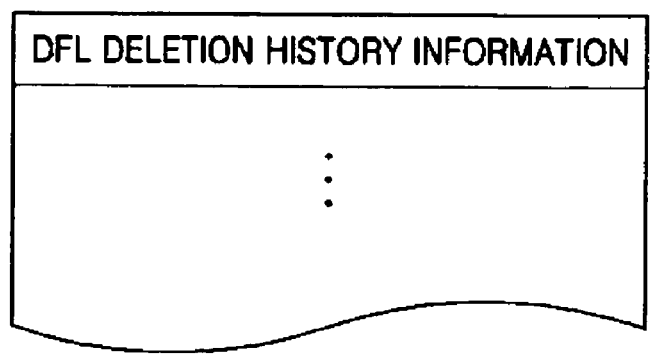
FIG. 13A illustrates an example storage of DLF deletion history information in a defect list (TDFL) for efficient replacement entry recovery according to an embodiment of the present invention.
Figure 13B:
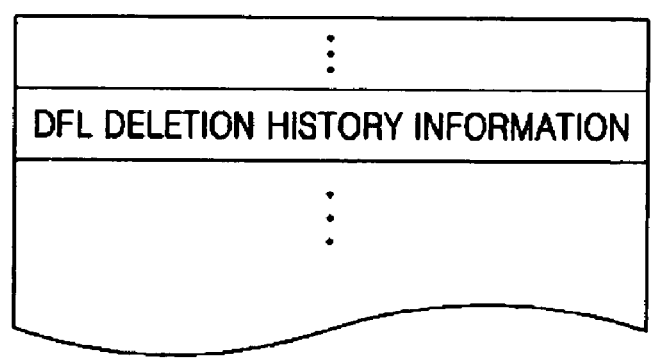
FIG. 13B illustrates an example storage of DFL deletion history information in a temporary disk definition structure (TDDS) for the efficient replacement entry recovery according to an embodiment of the present invention.
Figure 13C:
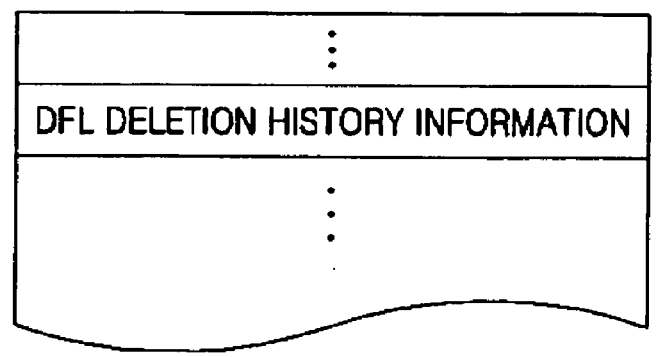
FIG. 13C illustrates an example storage of DFL deletion history information in a user control area included in a lead-in area for the efficient replacement entry recovery according to an embodiment of the present invention.
Figure 13D:
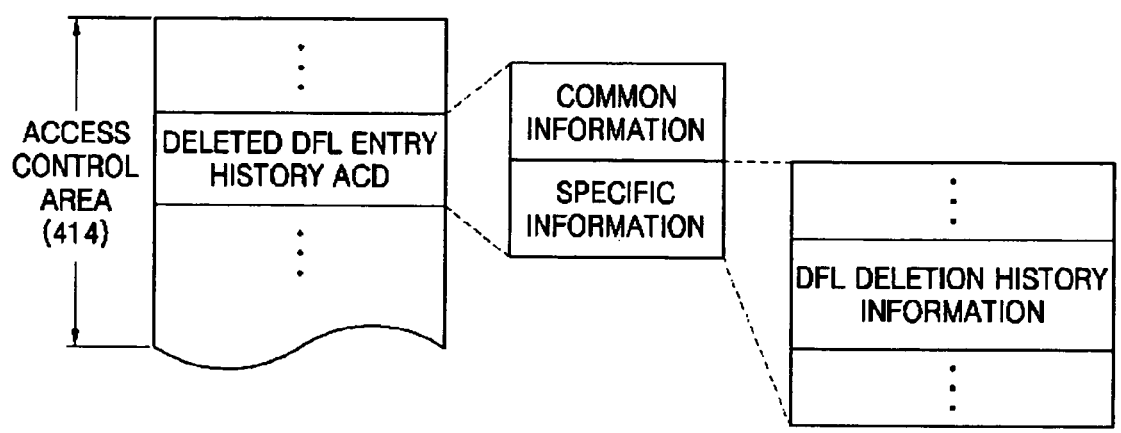
FIG. 13D illustrates an example storage of DFL deletion history information in an access control area included in a lead-in area for the efficient replacement entry recovery according to an embodiment of the present invention.

The DFL deletion history information described above can be stored in at least one of the defect list (TDFL) 500 shown in FIG. 13A, the temporary disk definition structure (TDDS) 520 shown in FIG. 13B, the user control area 415 shown in FIG. 13C and the access control area 414 shown in FIG. 13D. In particular, when the DFL deletion history information is stored in the access control area 414, it is preferable that access control data called "deleted DFL entry history ACD" is prepared and the DFL deletion history information is stored in a specific information field among common information field and specific information field included in the access control data. The common information of the access control data is least information with which even a drive system 200 not having a function related to the access control data can recognize the disk 400 to perform an access control, and the individual information is information set for a drive system 200 having a function related to the access control data to realize the function.

As described from the foregoing, the present invention advantageous provides new techniques to delete replacement entries unused by a file system (FS) and replacement entries not including valid user data in a system in which LOW replacement is performed, so as to prevent an overflow of a defect list and minimize the size of the defect list, thereby increasing medium usage efficiency. In addition, by managing information on deleted replacement entries, when a defect list is recovered due to a damage of the defect list, the deleted replacement entries are not recovered, so as to prevent an overflow of the defect list Various embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, DVDs, etc.), and storage media such as carrier waves (e.g., transmission through the Internet). The computer readable recording medium can also be distributed over network coupled computer systems so that the computer readable code is stored and executed in a distributed fashion. And the functional programs, codes and code segments for embodying the present invention may be easily deducted by programmers in the art which the present invention belongs to.

While there have been illustrated and described what are considered to be example embodiments of the present invention, it will be understood by those skilled in the art that various changes in form and modification may be made therein, and equivalents may be substituted for elements thereof without departing from the spirit and scope of the present invention. For example, other computer readable media such as read-only memory (ROM), random-access memory (RAM), CD-ROMs, magnetic tapes, floppy disks, optical or data storage devices, and carrier waves, as described in the context of a write-once or rewritable recording medium, may be utilized as long as the data replacement techniques as described in connection with FIG. 2, FIG. 3, FIG. 4, FIG. 6, FIG. 7, FIG. 8A-8B, FIGS. 9A-9B, FIGS. 10A-10B, FIGS. 11A-11B, FIGS. 12A-12E and FIGS. 13A-13D are utilized. Likewise, a central controller can be implemented as a chipset, or alternatively, a general or special purposed computer programmed to perform the methods as described with reference to FIG. 6 and FIG. 7. Accordingly, it is intended, therefore, that that present invention not be limited to the various example embodiments disclosed, but that the present invention includes all embodiments falling within the scope of the appended claims.

What is claimed is:

1. An information storage medium comprising:
    a data area to record data; and
    a management area comprising a defect list for storing one or more replacement entries having replacement information related to replacement of defects detected in data recorded in the data area on the information storage medium or replacement to update data recorded in the data area on the information storage medium,
    wherein at least one replacement entry having invalid replacement information among the replacement entries stored in the defect list is deleted, and
    wherein the invalid replacement information includes replacement information unused by a file system or replacement information related to invalid user data.

2. The information storage medium as claimed in claim 1, wherein each replacement entry includes an original address which indicates a start address of an original recording block of defect data, and a replacement address which indicates a start address of a replacement recording block of replacement data.

3. The information storage medium as claimed in claim 1, wherein the at least one replacement entry having invalid replacement information is deleted by a host or by a drive system according to a command from the host.

4. The information storage medium as claimed in claim 1, wherein the information storage medium is a write-once information storage medium.

5. A replacement information management method comprising:
    providing a defect list for storing one or more replacement entries having replacement information related to replacement of defects detected in data recorded on an information storage medium or replacement to update date recorded on the information storage medium; and
    deleting at least one replacement entry having invalid replacement information among replacement entries stored in the defect list,
    wherein the invalid replacement information includes replacement information unused by a file system or replacement information related to invalid user data.

6. The method as claimed in claim 5, wherein each replacement entry includes an original address which indicates a start address of an original recording block of defect data, and a replacement address which indicates a start address of a replacement recording block of replacement data.

7. The method as claimed in claim 5, wherein the deleting step comprises:
    receiving replacement entries from a recording/reproducing apparatus;
    selecting at least one replacement entry having the invalid replacement information from the received replacement entries; and
    transmitting a command of deleting the at least one replacement entry that was selected to the recording/reproducing apparatus.

8. The method as claimed in claim 7, wherein, when invalid replacement information and valid replacement information are mixed in a replacement entry according to the deletion command, the replacement entry is not deleted by the recording/reproducing apparatus.

9. The method as claimed in claim 7, wherein the deletion command includes at least one of a replacement entry deletion flag and information on a range of original addresses of replacement entries to be deleted from the defect list.

10. The method as claimed in claim 9, wherein the information on the range of the original addresses is represented by information on a start address of the original addresses to be deleted from the defect list and a range to be deleted from the start address or by a start address and an end address of the original addresses to be deleted from the defect list.

11. The method as claimed in claim 5, wherein the deleting step comprises:
receiving the defect list from a recording/reproducing apparatus;
deleting at least one replacement entry having the invalid replacement information from the defect list; and
transmitting the defect list from which the at least one replacement entry having the invalid replacement information has been deleted to the recording/reproducing apparatus.

12. The method as claimed in claim 11, wherein, when invalid replacement information and valid replacement information are mixed in a replacement entry, the deleting step comprises determining not to delete the replacement entry from the defect list.

13. A recording/reproducing apparatus comprising:
a write/read unit arranged to write/read data on/from an information storage medium including a defect list for storing replacement entries having replacement information related to replacement of defects detected in data recorded on the information storage medium or replacement to update data recorded on the information storage medium; and
a controller arranged to delete at least one replacement entry having the invalid replacement information among the replacement entries stored in the defect list,
wherein the invalid replacement information includes replacement information unused by a file system or replacement information related to invalid user data.

14. The recording/reproducing apparatus as claimed in claim 13, wherein each replacement entry includes an original address which indicates a start address of an original recording block of defect data, and a replacement address which indicates a start address of a replacement recording block of replacement data.

15. The recording/reproducing apparatus as claimed in claim 13, wherein the controller receives a command of deleting at least one replacement entry having invalid replacement information from a host, and deletes the at least one replacement entry from the defect list in response to the command.

16. The recording/reproducing apparatus as claimed in claim 15, wherein when invalid replacement information and valid replacement information are mixed in a replacement entry, the controller does not delete the replacement entry.

17. A recording/reproducing apparatus comprising:
a write/read unit arranged to write/read data on/from an information storage medium including a defect list for storing replacement entries having replacement information related to replacement of defects detected in data recorded on the information storage medium or replacement to update data recorded on the information storage medium; and
a controller arranged to delete at least one replacement entry having invalid replacement information among the replacement entries stored in the defect list,
wherein the controller receives from a host, the defect list from which the at least one replacement entry having the invalid replacement information is deleted, and replaces the defect list with a modified defect list received from the host.

18. A host apparatus for controlling operation of a recording/reproducing apparatus, the host apparatus comprising:
means for receiving a defect list for storing replacement entries having replacement information related to replacement of defects detected in data recorded on an information storage medium or replacement to update data recorded on the information storage medium; and
a controller configured to delete at least one replacement entry having invalid replacement information among replacement entries stored in the defect list,
wherein the invalid replacement information includes replacement information unused by a file system or replacement information related to invalid user data.

19. The host apparatus as claimed in claim 18, wherein each replacement entry includes an original address which indicates a start address of an original recording block of defect data, and a replacement address which indicates a start address of a replacement recording block of replacement data.

20. The host apparatus as claimed in claim 18, wherein the controller selects the at least one replacement entry having invalid replacement information among replacement entries received from the recording/reproducing apparatus recording data on or reproducing data from the information storage medium and transmits a command of deleting the at least one replacement entry that was selected to the recording/reproducing apparatus.

21. The host apparatus as claimed in claim 20, wherein the command of deleting the at least one replacement entry that was selected includes at least one of a replacement entry deletion flag and information on a range of original addresses of replacement entries to be deleted from the defect list.

22. A host apparatus for controlling operation of a recording/reproducing apparatus, the host apparatus comprising:
means for receiving a defect list for storing replacement entries having replacement information related to replacement of defects detected in data recorded on an information storage medium or replacement to update data recorded on the information storage medium; and
a controller configured to delete at least one replacement entry having invalid replacement information among replacement entries stored in the defect list,
wherein the controller deletes the at least one replacement entry having invalid replacement information from the defect list received from the recording/reproducing apparatus, and transmits a defect list from which the at least one replacement entry having invalid replacement information has been deleted to the recording/reproducing apparatus.

23. The host apparatus as claimed in claim 22, wherein when invalid replacement information and valid replacement information are mixed in a replacement entry, the controller does not delete the replacement entry from the defect list.

24. An information storage medium comprising:
a data area to record data; and
a management area different from the data area, comprising a defect list for storing replacement entries having replacement information related to replacement of defects detected in data recorded in the data area on the information storage medium or replacement to update data recorded in the data area on the information storage medium, wherein, if at least one replacement entry having invalid replacement information among the replacement entries stored in the defect list is deleted, information on the at least one replacement entry that was deleted is recorded in a predetermined area on the information storage medium.

25. The information storage medium as claimed in claim 24, wherein the information on the at least one replacement entry that was deleted includes at least one of defect list location information right before the deletion of the at least one replacement entry, defect list location information right after the deletion of the at least one replacement entry, location information of a temporary disk definition structure (TDDS) containing the defect list location information right before the deletion of the at least one replacement entry, location information of a TDDS containing the defect list location information right after the deletion of the at least one replacement entry that was deleted, original location information of the at least one replacement entry, replacement location information of the at least one replacement entry that was deleted, a deletion count indicating the number of replacement entry deletion operations, and a deletion flag indicating whether a replacement entry deletion operation is performed.

26. The information storage medium as claimed in claim 24, wherein the predetermined area corresponds to one of the management area, a user control area, and an access control area on the information storage medium.

27. A recording/reproducing apparatus comprising:
a write/read unit arranged to write/read data on/from an information storage medium including a defect list for storing the replacement entries having replacement information related to replacement of defects detected in data recorded on the information storage medium or replacement to update data recorded on the information storage medium; and
a controller configured to control the write/read unit to write information on at least one replacement entry that was deleted in a predetermined area of the information storage medium, if at least one replacement entry having invalid replacement information among the replacement entries stored in the defect list is deleted.

28. The recording/reproducing apparatus as claimed in claim 27, wherein the information on the at least one replacement entry that was deleted includes at least one of defect list location information right before the deletion of the at least one replacement entry, defect list location information right after the deletion of the at least one replacement entry, location information of a temporary disk definition structure (TDDS) containing the defect list location information right before the deletion of the at least one replacement entry, location information of a TDDS containing the defect list location information right after the deletion of the at least one replacement entry, original location information of the at least one replacement entry that was deleted, replacement location information of the at least one replacement entry that was deleted, a deletion count indicating the number of replacement entry deletion operations, and a deletion flag indicating whether a replacement entry deletion operation is performed.

29. The recording/reproducing apparatus as claimed in claim 27, wherein the predetermined area corresponds to one of a defect list, a temporary disk definition structure (TDDS), a user control area, and an access control area on the information storage medium.

30. A recording/reproducing method comprising:
recording/reading data on/from an information storage medium including a defect list for storing replacement entries having replacement information related to replacement of defects detected in data recorded on the information storage medium or replacement to update data recorded on the information storage medium;
determining if at least one replacement entry having invalid replacement information among the replacement entries stored in the defect list is deleted; and
recording information on the at least one replacement entry that was deleted in a predetermined area of the information storage medium.

31. The method as claimed in claim 30, wherein the information on the at least one replacement entry that was deleted includes at least one of defect list location information right before the deletion of the at least one replacement entry, defect list location information right after the deletion of the at least one replacement entry, location information of a temporary disk definition structure (TDDS) containing the defect list location information right before the deletion of the at least one replacement entry, location information of a TDDS containing the defect list location information right after the deletion of the at least one replacement entry, original location information of the at least one replacement entry that was deleted, replacement location information of the at least one replacement entry that was deleted, a deletion count indicating the number of replacement entry deletion operations, and a deletion flag indicating whether a replacement entry deletion operation is performed.

32. The method as claimed in claim 30, wherein the predetermined area corresponds to one of a defect list, a temporary disk definition structure (TDDS), a user control area, and an access control area on the information storage medium.

33. A defect list recovering method comprising:
reading, from an information storage medium in which at least one replacement entry having invalid replacement information among replacement entries stored in a defect list for storing the replacement entries having replacement information related to replacement of defects detected in data recorded on the information storage medium or replacement to update data recorded on the information storage medium is deleted, information on the at least one replacement entry that was deleted; and
recovering a damaged defect list based on the information on the at least one replacement entry that was deleted.

34. An information storage medium comprising:
a data area for recording data; and
a defect management area for managing one or more defects occurred in the data area, comprising a defect list for storing one or more replacement entries containing information regarding one or more defects occurred in data recorded in the data area,
wherein at least one replacement entry is identified to be deleted by a host or a drive system as being unused by a file system or containing invalid data.

35. The information storage medium as claimed in claim 34, wherein each replacement entry includes an original address which indicates a start address of an original recording block of defect data, and a replacement address which indicates a start address of a replacement recording block of replacement data.

36. The information storage medium as claimed in claim 34, wherein the host is configured to:

transmit a replacement entry request to the drive system;

select, upon receipt replacement entries transmitted from drive system, replacement entries on the defect list to be deleted indicating one of unused replacement entries, replacement entries which contain invalid data and replacement entries which are determined to be deleted for other predetermined reasons; and inform the drive system of selected replacement entries to be deleted so as to enable the drive system to delete corresponding selected replacement entries from the defect list on the information storage medium.

37. The information storage medium as claimed in claim 34, wherein the host is configured to:

transmit a replacement entry request to the drive system;

receive replacement entries on the defect list from the drive system;

select replacement entries on the defect list to be deleted indicating one of unused replacement entries, replacement entries which contain invalid data and replacement entries which are deemed to be deleted for other predetermined reasons, and delete corresponding selected replacement entries;

transmit modified replacement entries to the drive system so as to enable the drive system to operate using the modified replacement entries.

38. The information storage medium as claimed in claim 34, wherein information regarding deletion of the at least one replacement entry that was deleted from the defect list is recorded in a predetermined area on the information storage medium.

39. The information storage medium as claimed in claim 38, wherein the predetermined area corresponds to one of a defect list, a temporary disk definition structure (TDDS), a user control area, and an access control area on the information storage medium.

* * * * *